US009742719B2

(12) United States Patent
Acharya et al.

(10) Patent No.: US 9,742,719 B2
(45) Date of Patent: Aug. 22, 2017

(54) METHOD FOR REAL-TIME VIRAL EVENT PREDICTION FROM SOCIAL DATA

(71) Applicant: International Business Machines Corporation, Armonk, NY (US)

(72) Inventors: Arup Acharya, Nanuet, NY (US); Kirk A. Beaty, Goldens Bridge, NY (US); Puneet Jain, Urbana, IL (US); Justin G. Manweiler, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 14/445,141

(22) Filed: Jul. 29, 2014

(65) Prior Publication Data

US 2015/0350149 A1    Dec. 3, 2015

Related U.S. Application Data

(60) Provisional application No. 62/006,484, filed on Jun. 2, 2014.

(51) Int. Cl.
*H04L 12/58*     (2006.01)
*G06N 99/00*     (2010.01)
(Continued)

(52) U.S. Cl.
CPC .............. *H04L 51/32* (2013.01); *H04L 51/16* (2013.01); *G06N 99/005* (2013.01); *H04L 51/12* (2013.01); *H04N 21/4788* (2013.01)

(58) Field of Classification Search
CPC ......... H04L 51/32; H04L 67/22; H04L 43/04; H04L 41/142; H04L 51/14; G06Q 50/01; G06Q 30/02; G06Q 30/0201; G06F 17/30867; G06F 17/3053; G06N 99/005; G06N 5/02; G06N 7/005
(Continued)

(56) References Cited

U.S. PATENT DOCUMENTS 8,195,598 B2    6/2012   Hua et al.
8,312,056 B1 *  11/2012  Peng ................... G06Q 50/01
                                                       705/319
(Continued)

FOREIGN PATENT DOCUMENTS

CN    103455705 A    12/2013

OTHER PUBLICATIONS

Abate, Tom, "Stanford computer scientists learn to predict which photos will go viral on Facebook", Stanford News, Stanford Report, Apr. 3, 2014.
(Continued)

*Primary Examiner* — Ruolei Zong
(74) *Attorney, Agent, or Firm* — Lance I. Hochhauser; David B. Woycechowsky

(57) ABSTRACT

Filtering a set of social messages received in real time to yield a sub-set likely to relate to some first substantive content subject (such as a video available online). For each message in the sub-set, a respective social message sender, and a corresponding social influence value for each respective social message sender is determined. A prediction of the extent of the spread of the substantive content subject is made based on the social influence values of the social message senders.

20 Claims, 11 Drawing Sheets

(51) Int. Cl.
  *G06N 5/04* (2006.01)
  *H04N 21/24* (2011.01)
  *H04N 21/4788* (2011.01)

(58) Field of Classification Search
  USPC .......................................................... 709/206
  See application file for complete search history.

(56) References Cited

U.S. PATENT DOCUMENTS

| | | | | |
|---|---|---|---|---|
| 8,332,512 | B1* | 12/2012 | Wu .................... | G06Q 30/0254 705/319 |
| 8,620,841 | B1 | 12/2013 | Filson et al. | |
| 2011/0295626 | A1* | 12/2011 | Chen ...................... | G06Q 30/02 705/7.11 |
| 2011/0302103 | A1* | 12/2011 | Carmel .............. | G06Q 30/0282 705/347 |
| 2012/0278476 | A1 | 11/2012 | Agrawal et al. | |
| 2013/0041860 | A1* | 2/2013 | Lawrence .............. | G06Q 50/01 706/46 |
| 2013/0091222 | A1* | 4/2013 | Brayman ............ | H04L 12/1859 709/204 |
| 2014/0040277 | A1* | 2/2014 | Asur ................. | G06F 17/30283 707/748 |
| 2014/0122622 | A1* | 5/2014 | Castera ................... | H04L 51/32 709/206 |
| 2014/0195296 | A1* | 7/2014 | Smyth ................ | G06Q 10/0635 705/7.28 |
| 2014/0344281 | A1* | 11/2014 | Rao ........................ | H04L 67/22 707/741 |
| 2015/0019474 | A1* | 1/2015 | Barbieri ............. | G06Q 30/0251 706/53 |
| 2015/0081609 | A1* | 3/2015 | Hande ................... | G06Q 50/01 706/46 |
| 2015/0100538 | A1* | 4/2015 | Chung ................... | G06Q 50/01 706/52 |
| 2015/0161517 | A1* | 6/2015 | Bae ........................ | H04L 67/22 709/204 |
| 2015/0326466 | A1* | 11/2015 | Hegde ................... | G06Q 10/10 709/223 |

OTHER PUBLICATIONS

Beese, Jennifer, "Twitter's Latest Experimental Account Tries to Predict Viral Tweets", Nov. 27, 2013.

Mell et al., "The NIST Definition of Cloud Computing", National Institute of Standards and Technology, Information Technology Laboratory, Version 15, Oct. 7, 2009.

"A System and Method to Use Online Event Reservation Data and Social Network Data to Learn About Friends and Family's Plans to Attend Social, Cultural and Business Events", An IP.com Prior Art Database Technical Disclosure, Authors et. al.: Disclosed Anonymously, IP.com No. IPCOM000220875D, IP.com Electronic Publication: Aug. 10, 2012, pp. 1-3.

"Method and System for Detecting Anomalous Events and Behaviors in Social Networks", An IP.com Prior Art Database Technical Disclosure, Authors et. al.: Disclosed Anonymously, IP.com No. IPCOM000235857D, IP.com Electronic Publication: Mar. 27, 2014, pp. 1-3.

"System and method for social event acceptance", An IP.com Prior Art Database Technical Disclosure, Authors et. al.: Disclosed Anonymously, IP.com No. IPCOM000230674D, IP.com Electronic Publication: Aug. 31, 2013.

"System and method to analyze social recommendation data", An IP.com Prior Art Database Technical Disclosure, Authors et. al.: Disclosed Anonymously, IP.com No. IPCOM000228695D, IP.com Electronic Publication: Jun. 30, 2013, pp. 1-3.

\* cited by examiner

METHOD FOR REAL-TIME VIRAL EVENT PREDICTION FROM SOCIAL DATA

BACKGROUND OF THE INVENTION

The present invention relates generally to the fields of data mining, real-time analytics and internet (see definition, below, in Definitions sub-section of the Detailed Description section) social media interactions.

Known techniques for processing data generated and/or communicated over the internet include the following: (i) viral phenomena "predictions" (performed after the fact based on historic data); (ii) rapid response to events in marketing and advertising; (iii) customer specific "micro trend" analysis; (iv) content pre-fetching; (v) influence analysis; (vi) belief propagation; (vii) sentiment mining; (viii) user behavior analysis; (ix) information reach; and (x) fraud detection. Techniques (i) to (x) will herein collectively be referred to as "Internet Data Analysis Techniques" (IDAT).

On a popular microblogging site, thousands of new microblogging posts, every minute, talk about various kinds of "substantive content" (see definition of "substantive content" in Definitions sub-section of the Detailed description section). Along with microblog posts (which are generally limited to a set number of characters in length—for example, a 140 character limit), these microblog posts often contain an explicit, unambiguous name or "identifier" of the substantive content, at least when the substantive content is in the form of "substantive online content" (see definition of "substantive online content," below, in the Definitions sub-section of the Detailed Description section). For example, in the case of microblog posts about videos available on a popular video sharing site, many of the related microblog posts will typically include the uniform resource locator (URL) of the video to which the microblog post relates. The text, image and/or other content of the microblog entry typically provides some indication of the type and identity of substantive content. More specifically, substantive online content is often referenced by the explicit identifier (for example, URL of a video at a video sharing site). An example of the foregoing type of microblogging post is as follows "Newborn Baby Kittens is a cute video on www.vidsharesite.com/aaabbbccc!!" In this example microblog post, the posting user mentions a video URL (that is, the identifier) of a particular video available online (that is, the substantive online content).

The concept of "popular video" versus "viral video," as it is conventionally understood will now be discussed. The viral video tends to peak more sharply and wane more rapidly that the popular video. On the other hand, popular music video exhibits a steady and regular growth pattern after a peak viewing period. Some conventionally recognized factors contributing to virality of viral videos are as follows: (i) tastemakers; (ii) creative participating community; and/or (iii) unexpectedness.

SUMMARY

According to an aspect of the present invention, there is a method, computer program product and/or system for processing multiple social messages that performs the following steps (not necessarily in the following order): (i) receiving a set of social messages in real time; (ii) filtering the set of social messages to determine a first sub-set of social message(s) from the set of social messages, so that each message of the first sub-set of social message(s) is likely to relate to a first substantive content subject; (iii) for each message in the first sub-set of social message(s), determining a respective social message sender and a corresponding social influence value for each respective social message sender; (iv) estimating a likely social propagation of the message(s) of the first sub-set of social message(s) based, at least in part, on the social influence graph values of the respective sender(s) of the first sub-set of social message(s); and (v) predicting a first spread of the first substantive content subject based, at least in part, on the estimated likely social propagation of the first sub-set of social message(s).

DETAILED DESCRIPTION

Figure 1:
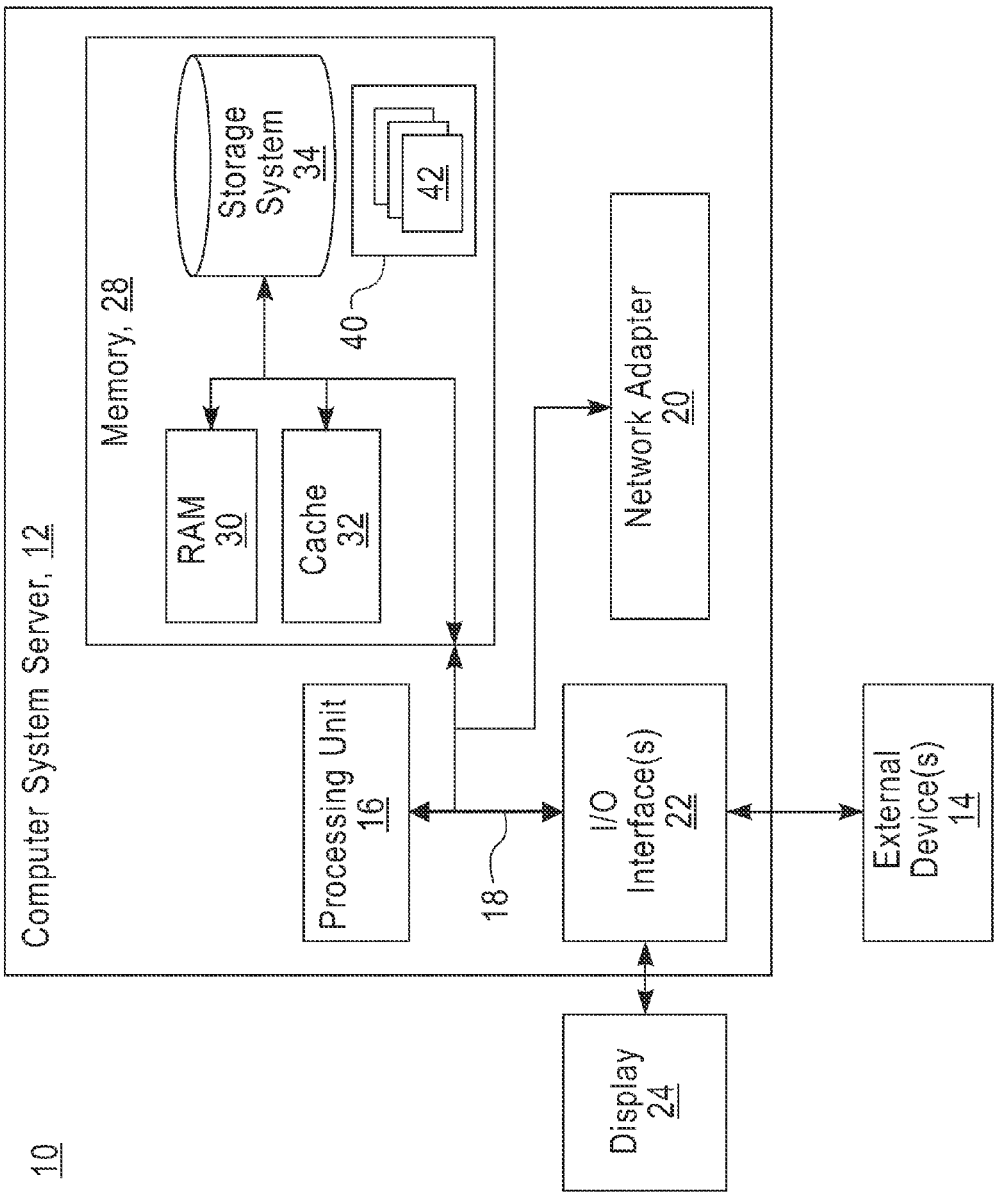
FIG. 1 depicts a cloud computing node (also called "first embodiment system") according to an embodiment of the present invention.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
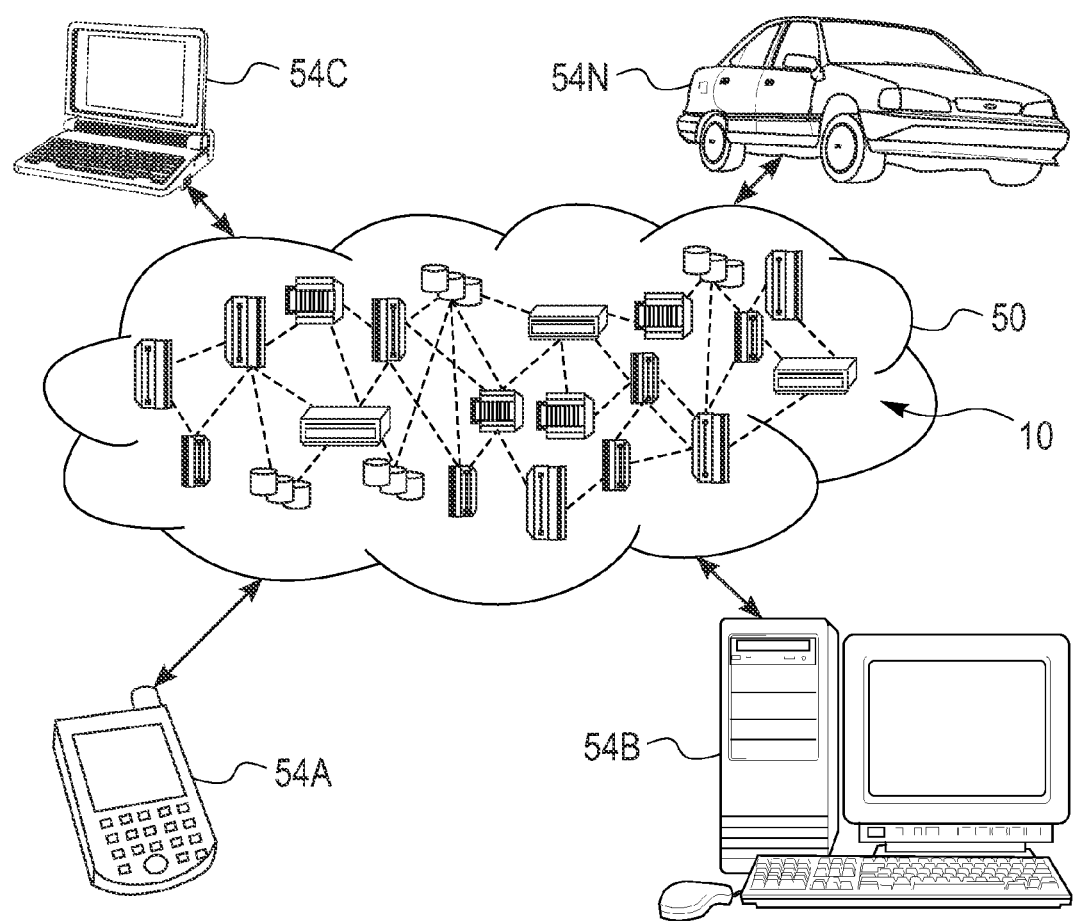
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
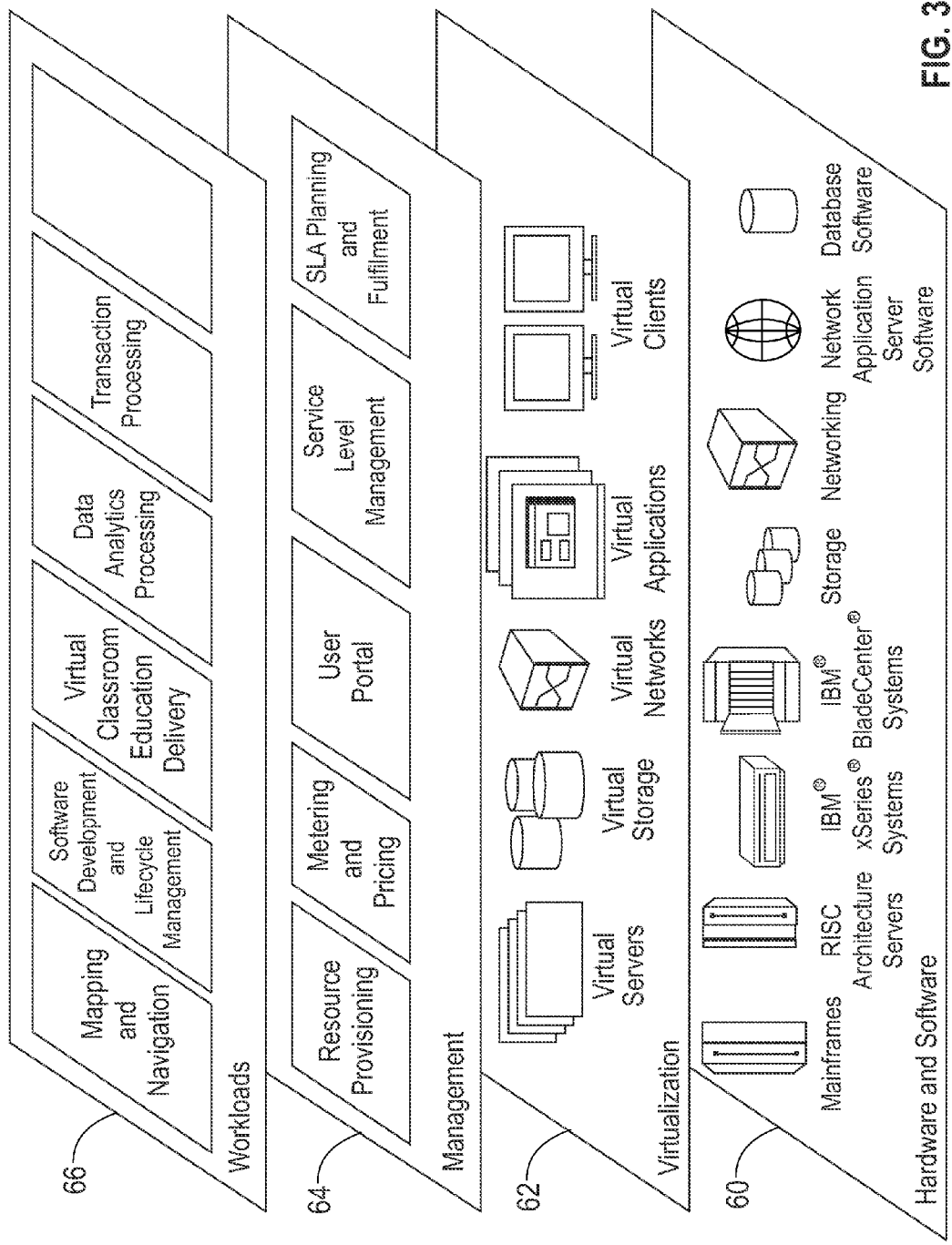
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing. The blank block at the right hand end of workloads 66 block represents workloads of the present invention such a incoming social activity posts and/or incoming video URLs.

II. EXAMPLE EMBODIMENT

Figure 4:
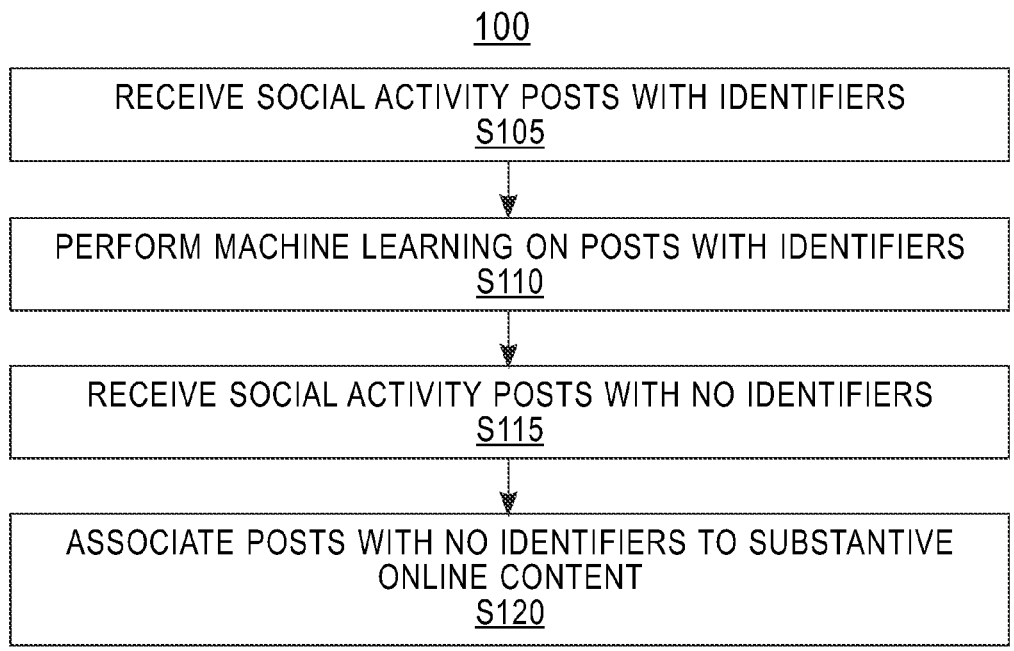
FIG. 4 is a flowchart showing a first embodiment method performed, at least in part, by the first embodiment system.
Figure 5:
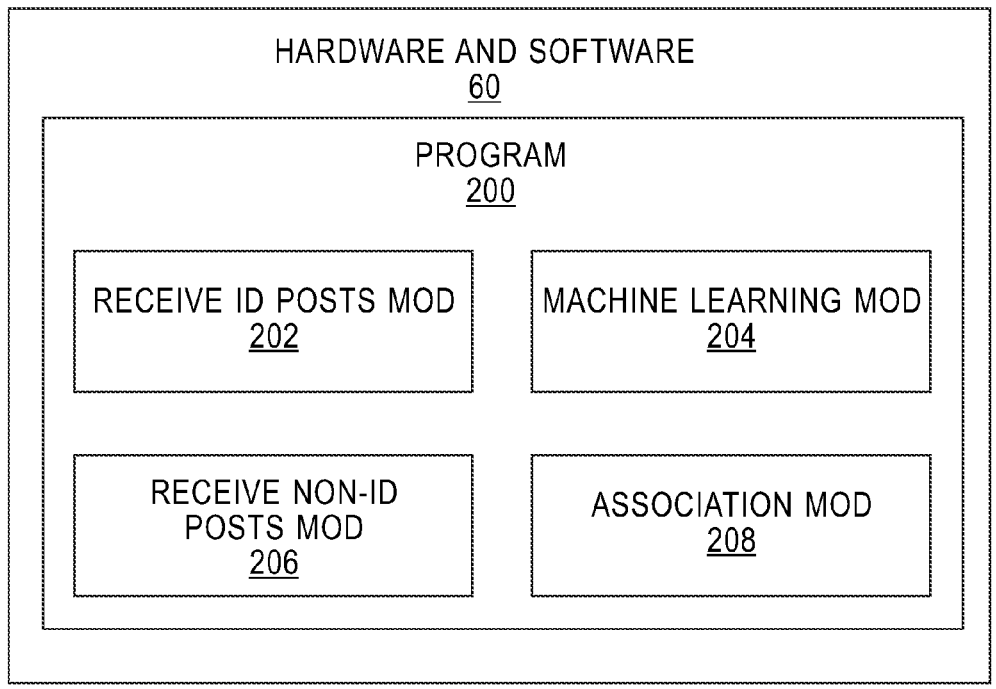
FIG. 5 is a block diagram view of a machine logic (for example, software) portion of the first embodiment system.

FIG. 4 shows flowchart 100 depicting a method according to the present invention. FIG. 5 shows program 200 (located in hardware and software 60 block (see FIG. 3)) for performing at least some of the method steps of flowchart 100. This method and associated software will now be discussed, over the course of the following paragraphs, with extensive reference to FIG. 4 (for the method step blocks) and FIG. 5 (for the software blocks).

Processing begins at step S105, where receive ID posts module ("mod") 202 of program 200 in hardware and software 60 block receives various types of social activity posts (including, but not limited to microblog posts) which have been determined to include an "identifier" of at least one specific piece of "substantive online content." As explained above, in the Background section, the "identifier" is an unambiguous indication of a specific piece of substantive online content. Some examples of "identifiers" of substantive online content are as follows: (i) www.videosharingsite.edu/1234abcd; (ii) "*My Life Is A Triangle*, the internet novel by Able Baker Chanceford;" (iii) an image which is a popular "still" taken from a specific video on an internet sharing site; and/or (iv) a ten second sample of a song which is available as an audio download on the internet. "Substantive online content" is one type of "substantive content," and these terms are both defined, below, in the definitions sub-section of this detailed description section.

Processing proceeds to step S110, where machine learning mod 204 uses machine learning, in conjunction with the posts received at step S105, to identify other indications, besides an unambiguous identifier, that a social activity post is implicitly, or inferentially, referring to a specific piece of substantive online content. Assume that the substantive online content is an online version of the William Shakespeare play "Hamlet." Machine learning mod determines that social activity posts with a URL corresponding to the online version of this play, "Hamlet," tend, much, more strongly than other blog entries to include the phrase "Uncle Claudius." In this way machine learning mod may learn to associate the phrase "Uncle Claudius" with the online version of Hamlet.

Processing proceeds to step S115, where receive non-id posts mod 206 receives a further set of social activity posts (in real time in this example), but, unlike the posts received at step S105, the posts received at step S115 do not necessarily include an identifier that unambiguously relates to one, or more, pieces of substantive online content.

Processing proceeds to step S120, where association mod 208 associates, where appropriate, the posts received at step S115 with substantive online content (in real time in this example). Of course, when one of these posts has an identifier then that will be used to identify the associated online content. However, even if the post does not include an identifier, it still may be able to be associated with a piece of substantive online content through analytics, analysis and machine learning, which was previously developed at step S110.

III. FURTHER COMMENTS AND/OR EMBODIMENTS

Some embodiments of the present invention recognize the following potential problem with respect to the current state of the art: implementation of various types of IDAT (see, Background section, above for an explanation of IDAT) in an actual system is often non-trivial and challenging due to reasons such as the scale of the coming data. For instance, before a video goes viral on an internet video distribution site, early sharing trends are often noticeable on various social mediums such as Facebook and Twitter. (Note: the term(s) "Facebook" and/or "Twitter" may be subject to trademark rights in various jurisdictions throughout the world and are used here only in reference to the products or services properly denominated by the marks to the extent that such trademark rights may exist.) Existing IDAT solutions often are only capable of performing an after-the-fact analysis of the phenomena (viral spread, sentiment, "micro trend," etc.) that they are designed to detect, instead of making a prediction. This is because these conventional systems cannot collect and/or process their input data quickly enough to predict a phenomenon before it actually happens. Some embodiments of the present invention further recognize that some conventional IDAT systems effectively ignore challenges typically encountered in a "real-world setting."

Some embodiments of the present invention recognize that a large number of microblog entries are directed to the same "substantive online content" (for example, a certain video available for viewing at a video sharing site, see full definition of "substantive online content" in the Definitions sub-section of this Detailed Description section), but some of these microblog entries do not contain explicit identifiers (for example, URLs). As an example of this kind of microblog entry, a user may post as follow: "I find the Newborn Baby Kittens video to be the epitome and zenith of all that is cute." This example microblog entry does not have an explicit and definitive content identifier (specifically, in this example, URL) included in the brief body of its prose.

Some embodiments of the present invention may include one, or more, of the following features, characteristics and/or advantages: (i) a cloud-based large scale framework to perform real-time analysis and predictions on streaming social data; (ii) a software and hardware architecture for running prediction models on the cloud; (iii) a prediction system to answer one, or more, of the following questions: (a) among all recited video URLs (uniform resource locator) in microblog streams, which video is most likely to go viral (that is, increase in views at an exponential rate) on an internet video sharing site? (b) given a specific topic and initial microblogging behavior on the same, how far and fast will the exponentially-growing video views propagate?

Some embodiments of the present invention provide a hardware and software design that properly accounts for the real-time nature of online social data. According to recent statistics, 500 million "tweets" are made everyday on Twitter. (Note: the term(s) "tweets" may be subject to trademark rights in various jurisdictions throughout the world and are used here only in reference to the products or services properly denominated by the marks to the extent that such trademark rights may exist.) Recently, Twitter received 143,199 tweets in a second. Microblog traffic is typically voluminous and bursty.

In order to process such a quantity of data, some embodiments of the present invention: (i) are scalable and elastic in real-time; (ii) designed to scale to an arbitrary rate of incoming microblog streams; (iii) include a distributed cluster based on Big Data and online machine learning tools; (iv) are capable of running over tens (10s) of virtual machine instances to expand and shrink depending on incoming demand over time; (v) are able to predict which video will go viral on a popular video sharing site within a relatively short span of time; (vi) are based on microblog streams, monitoring and filtering microblog posts according to specific topics such as videos available on video sharing sites, store sales events, etc.; (vii) accept streams of parallel social data as input; (viii) splits and assigns work to worker machines; (ix) runs influence analysis on a dynamic microblog user graph (typically having millions of node and billions of edges); (x) outputs real-time predictions and emerging trends; (xi) achieve scalability to arbitrary rates of incoming social streams (for example, microblog streams) using a distributed cloud-based cluster leveraging "big data" processing paradigm; (xii) use Map Reduce; and/or (xiii) use online machine learning tools.

Further with respect to item (i) in the previous paragraph, "scalability" refers to the ability of the system to handle workloads of varying sizes (that you can scale up to meet demand, that the process can support different-scale workloads). "Elasticity" refers to the ability of the system to increase its scalability through the introduction of additional computing resources (for example, request of new VMs from the cloud provider).

Some embodiments of the present invention may include one, or more, of the following features, characteristics and/or advantages: (i) assignment of an explicit identifier (for example, video URL) to microblog posts automatically based on the stream of historic microblog posts seen in recent past; (ii) the microblog entry content contains enough metadata and/or content to differentiate a given concept (for example, video) from others; (iii) given a large number of microblog posts talking about the same "substantive content" (see definition of "substantive content," below, in the Definitions sub-section of this Detailed Description section), a prediction system automatically maps future microblog posts without explicit identifiers to an observed set; and/or (iv) mapping microblog to substantive online content (for example, videos) under a machine learning, multi-class online classification algorithm.

In some embodiments of the present invention, the following method is performed: (i) during a "training period," filtering certain microblog posts from total microblog traffic to create a "training set" of microblog posts that include at least one "explicit identifier" (for example, URL); (ii) for the "training set," identifying most frequently cited substantive content (for example, videos) to create a most-frequently-cited content set; (iii) creating "class labels" (for example, video IDs) corresponding to the content of the most-frequently cited content set; (iv) applying, as appropriate, the class labels to the microblog posts in the training set; (v) estimated, based upon the assignment of class labels to the microblog posts of the training set, certain parameters for the training period; and (vi) using the estimated parameters to predict class labels for microblog posts that: (a) come in after the training period is over, and (b) do not include an identifier for their substantive content.

With respect to step (iii) in the previous paragraph, it is noted that the total number of different pieces of substantive content (for example, hashtags, images, web sites, videos, ontological concepts (for example, the game of basketball)) implicated in microblog posts in a given training period might be huge, but some embodiments of the present invention reduce this problem to a finite size classification by looking into a fixed number of most frequently cited substantive content (or, more specifically in some embodiments, substantive online content). In some embodiments of the present invention, the feature set includes of an identifier (for example, video URL) as label and frequency of occurrence of each word as feature. In other words, machine learning process whereby it becomes possible to "guess" an identifier (for example, a URL) associated with a "substantive content subject" (for example, a tweet—see definition of substantive online subject," below, in the Definitions sub-section of this detailed description section). This occurs through a learned correlation where a pattern of words is statistically correlated with the URL. Thus, in one example, the words of a tweet become the "feature set" used in the process of "labeling" the tweet with the correct URL. Some embodiments of the present invention build a statistical index to predict this correlation.

Some embodiments of the present invention can be implemented and run on a public cloud platform as a live system.

Some embodiments of the present invention may be limited to a certain category of content. For example, some embodiments may be limited to: (i) shared videos that appear on free video sharing sites; and/or (ii) videos that appear on YouTube. (Note: the term(s) "YouTube" may be subject to trademark rights in various jurisdictions throughout the world and are used here only in reference to the products or services properly denominated by the marks to the extent that such trademark rights may exist.)

Some embodiments of the present invention perform the following method: (i) internalize social data in real-time into a large-scale representation of a social influence graph via parsing social messages and invocation of social network APIs (application programming interfaces); (ii) leveraging this social influence graph to estimate likely social propagation of a social message; and (iii) predicting global spread of a piece or type of substantive content (for example, a piece of substantive online content in the form of a shared video) from this estimated propagation.

Some embodiments of the present invention may include one, or more, of the following features, characteristics and/or advantages: (i) use Twitter as a source of social messages and APIs; (ii) use YouTube as a category of pieces of content; (iii) prediction of relative success of commercial campaigns and/or promotions through "viral" marketing; (iv) social messages' actual affect on system output is estimated through machine learning classification techniques (MLCT); (v) MLCT used to pre-filter relevant from irrelevant messages; (vi) MLCT where training is also taken from social message content; (vii) MLCT enhances system prediction accuracy and/or improves solution scalability; (viii) cloud elastic scalability increases consumption of computational resources depending on level of social activity and desired quality of analysis; and/or (ix) cloud elastic scalability reduces consumption of computation when allowable (for reduction of resource cost).

Some embodiments of the present invention may include one, or more, of the following features, characteristics and/or advantages: (i) provide real-time analysis, to implement IDAT (see explanation of IDAT, above, in the Background section) on cloud; (ii) provide a framework to apply existing social data analysis techniques in real-time on cloud; (iii) support huge size graph processing in distributed settings; (iv) support online machine learning algorithms; (v) include, or more of the following hardware and/or software constructs: Hadoop, HBase, Giraph, and Vowpal Wabbit; and/or (vi) use crowdsourced forecasting.

Some embodiments of the present invention answer one, or more, of the following questions and/or challenges: (i) what will be the next "Viral Video"?; (ii) How fast can we predict the next "Viral Video"?; (iii) catching such videos from Twitter data, before they go viral on YouTube; (iv) Big Data monitoring of customer accounts for customer targeted forecasting; (v) past knowledge sharing and trend correlation among multiple customers; and/or (vi) graph based anomaly detection in Twitter (for example detection of fake versus real accounts).

Apache HBase is a Hadoop database-compatible, distributed, scalable, big data store used in some embodiments of the present invention. Some relevant information on Apache HBase, as it relates to some embodiments of the present invention, are as follows: (i) distributed key-value store, modeled after Google BigTables; (ii) random, real time read/write access to Big Data; (iii) seamless integration with Hadoop MapReduce jobs; (iv) easy to maintain multiple temporal versions of same attribute; and/or (v) data is stored in HDFS (Hadoop Distributed File System, the mechanism that Hadoop provides for file storage and retrieval), hence guarantees all HDFS properties. (Note: the term(s) "Apache HBase," "Google BigTables" and/or "Hadoop" may be subject to trademark rights in various jurisdictions throughout the world and are used here only in reference to the products or services properly denominated by the marks to the extent that such trademark rights may exist.)

Apache Giraph is a software/hardware construct used in some embodiments of the present invention. Some relevant information on Apache Giraph, as it relates to some embodiments of the present invention, are as follows: (i) open source counterpart of Google Pregel; (ii) based on "bulk synchronous parallel models;" (iii) active and fast-developing community (current contributors include Facebook, LinkedIn, and Twitter developers); (iv) provides iterative graph processing; (v) scales to billions of node and trillions of edges; (vi) runs on top of Hadoop; and (vii) easy to implement algorithms like PageRank, ConnectedComponents, ShortestPath, etc. (Note: the term(s) "LinkedIn," "Facebook," "Apache Giraph," and/or "Google Pregel" may be subject to trademark rights in various jurisdictions throughout the world and are used here only in reference to the products or services properly denominated by the marks to the extent that such trademark rights may exist.)

The design of one embodiment of the present invention includes the following: (i) reconstructing a Twitter graph over time; (ii) graph analytics, machine learning, and predictions on the constructed graph; and (iii) prediction validations.

Figure 6A:
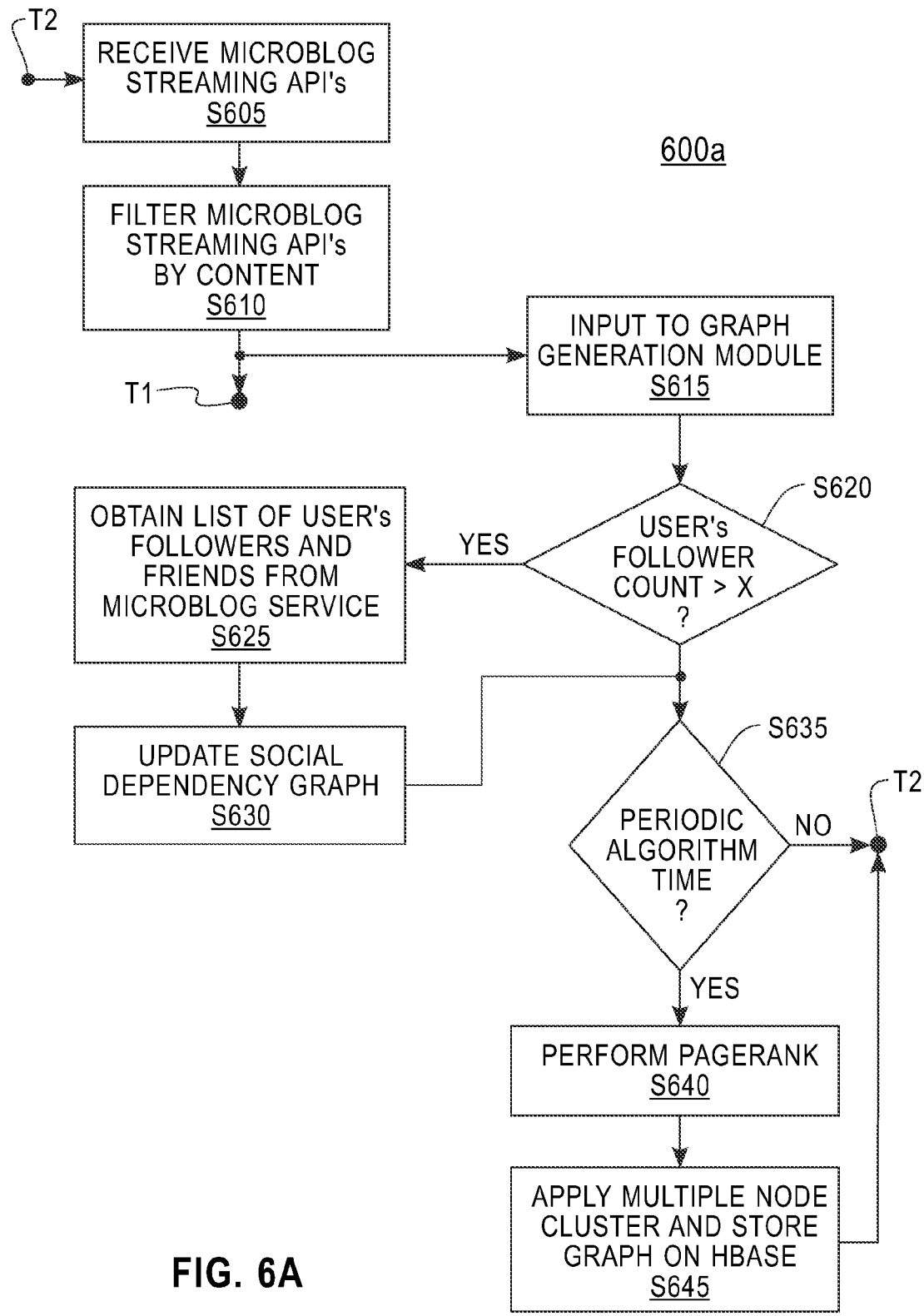
FIGS. 6A and 6B, taken collectively, are a flow chart showing a second embodiment of a method according to the present invention.
Figure 6B:
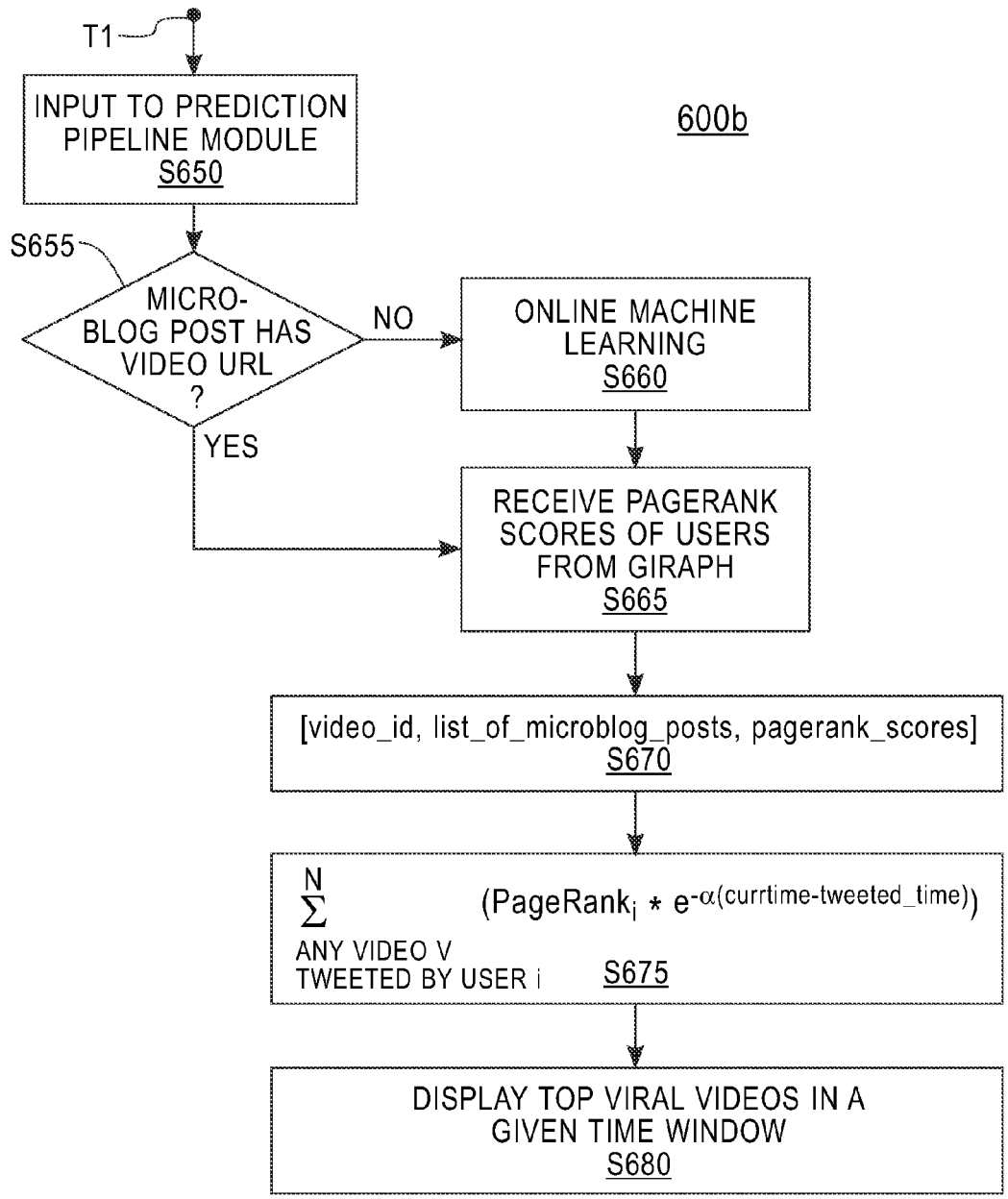

As shown in FIGS. 6A and 6B, flow chart 600 includes first portion 600a and second portion 600b, which are connected through terminal T1. Flow chart 600 is a method for predicting viral videos according to an embodiment of the present invention. This method will be discussed in the following paragraphs.

Processing begins at step S605 (see FIG. 6a), where microblog streaming APIs (include post content and metadata) are received. More specifically, in this embodiment, up to 55 microblog posts per second are received.

Processing proceeds to step S610 where microblog posts previously received at step S605 are filtered by "substantive content" (see definition, below, in the definitions sub-section of this Detailed Description section) using filtering software. One process flow path proceeds from step S610 to terminal T1, and this process flow path will be further discussed below in connection with portion 600b of flow chart 600.

Another process flow path proceeds to step S615, where the filtered microblog posts are input to a graph generation module (which, in this embodiment consists primarily of graph generation software. In this embodiment, Apache Giraph is a tool used to process/manipulate the social dependency graph after an initial version has been supplied. This embodiment also includes a graph-construction module which actually constructs the graph as streaming microblog APIs are received in real time. In this embodiment, the social dependency graph is stored in HDFS until it is processed through Giraph and other tools. In this embodiment the filtered microblog streaming APIs, as part of the graph generation, subject to 10 collection accounts, parallel graph generation techniques, and management of rate-limitation.

Processing proceeds to step S620 where, for each microblog streaming API: (i) an associated user is determined, and (ii) it is further determined whether the user has a follower count which is over a threshold X. In this example, X=999, but this value can be set by the system designer as a matter of system design.

If the user of a given microblog streaming API has a follower count greater than X, then processing proceeds to step S625, where a list of the user's followers and friends are obtained from the microblog service provider, in strict accordance with any applicable privacy policies and/or laws which may exist in a given application. Processing proceeds to step S630, where a social dependency graph (not separately shown) is updated with the information received at step S625.

Processing proceeds from step S620 (if user's follower count is less than or equal to X) or step S630 to step S635, where it is determined whether it is an appropriate time to apply any intermittent algorithms that may be preformed on the output of the streaming microblog APIs (for example, stream of tweets). If it is not time to apply any intermittent algorithm, then processing loops back through terminal T2, back to step S605.

If it is time to apply intermittent algorithm(s), then processing proceeds to step S640, where a PageRank algorithm is performed by software. PageRank is an algorithm used by Google Search to rank websites in their search engine results. PageRank is a way of measuring the importance of website pages. PageRank works by counting the number and quality of links to a page to determine a rough estimate of the web site's relative importance. The underlying assumption is that more important websites are likely to receive more links from other websites.

Processing proceeds to step S645, where multiple node cluster is applied, and the updated social dependency graph is stored on HBase. More specifically, in this example, a 21 node cluster, running on a public cloud, is used for application of the multiple node cluster. Processing then loops back through terminal T2 to step S605 to complete the 600a portion of flow chart 600.

Turning, now, to FIG. 6B, portion 600b, relating to prediction pipeline processing will be discussed. Processing starts at step S650, where the filtered microblog posts from step S610 (see FIG. 6A) are input to a prediction module (which, in this embodiment consists primarily of prediction pipeline software. This input of microblog streaming APIs is performed in real time.

Processing proceeds to step S655, where determination software determines whether each microblog streaming API includes a URL that refers to a publicly available video on a third party video sharing service. In cases where there is no URL, processing proceeds to step S660, where an online machine learning sub-module of the prediction pipeline module estimates, or predicts, one, or more, video URL that are being implicitly, or inferentially, referenced by the microblog streaming API under analysis in the prediction pipeline.

As shown by the process flow paths of FIG. 6B, processing proceeds from step S655 of S660 to step S665, where PageRank scores of users are received from Apache Giraph (see FIG. 6A at steps S640 and S645).

Processing proceeds to step S670, where the microblog activity of a specific video_id is tracked, aggregated in combination of pagerank scores. This basically shows that the data is being maintained in a way that is sorted according to individual video_id values. The data is also secondarily sorted according to the timeline of activity. Processing proceeds to step S675, where a computation of the combined data (organized in S670) is performed. The output of this summation is a heuristic which describes our belief that the video will go viral. Videos with higher scores reflect a greater likelihood of virality.

Processing proceeds to step S680, where the prediction pipeline module displays time predicted viral videos in a given time window.

Figure 7:
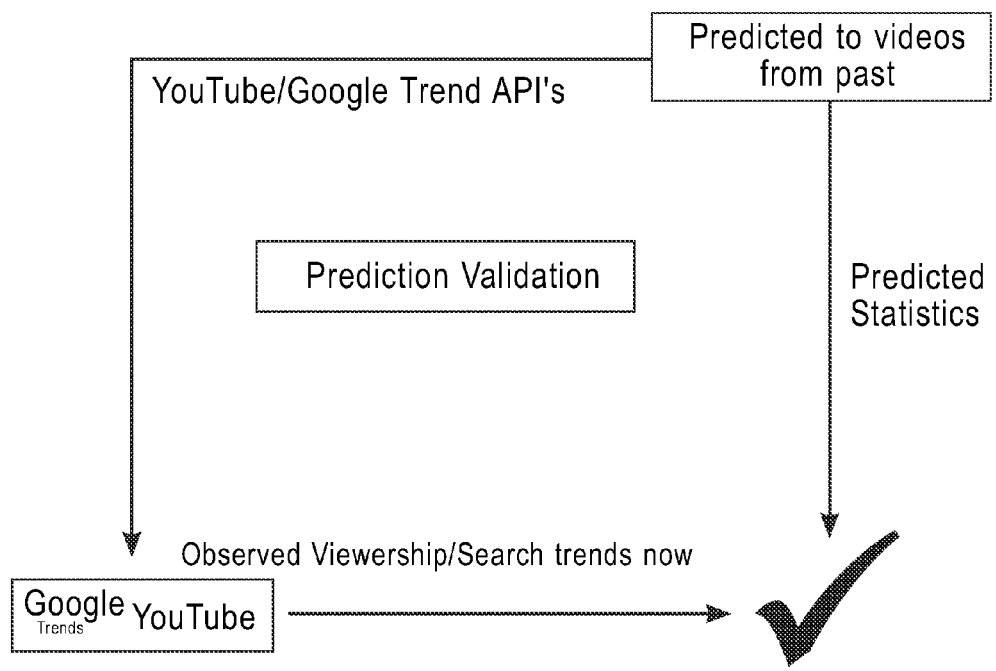
FIG. 7 is a diagram helpful in understanding some embodiments of the present invention.
Figure 8:
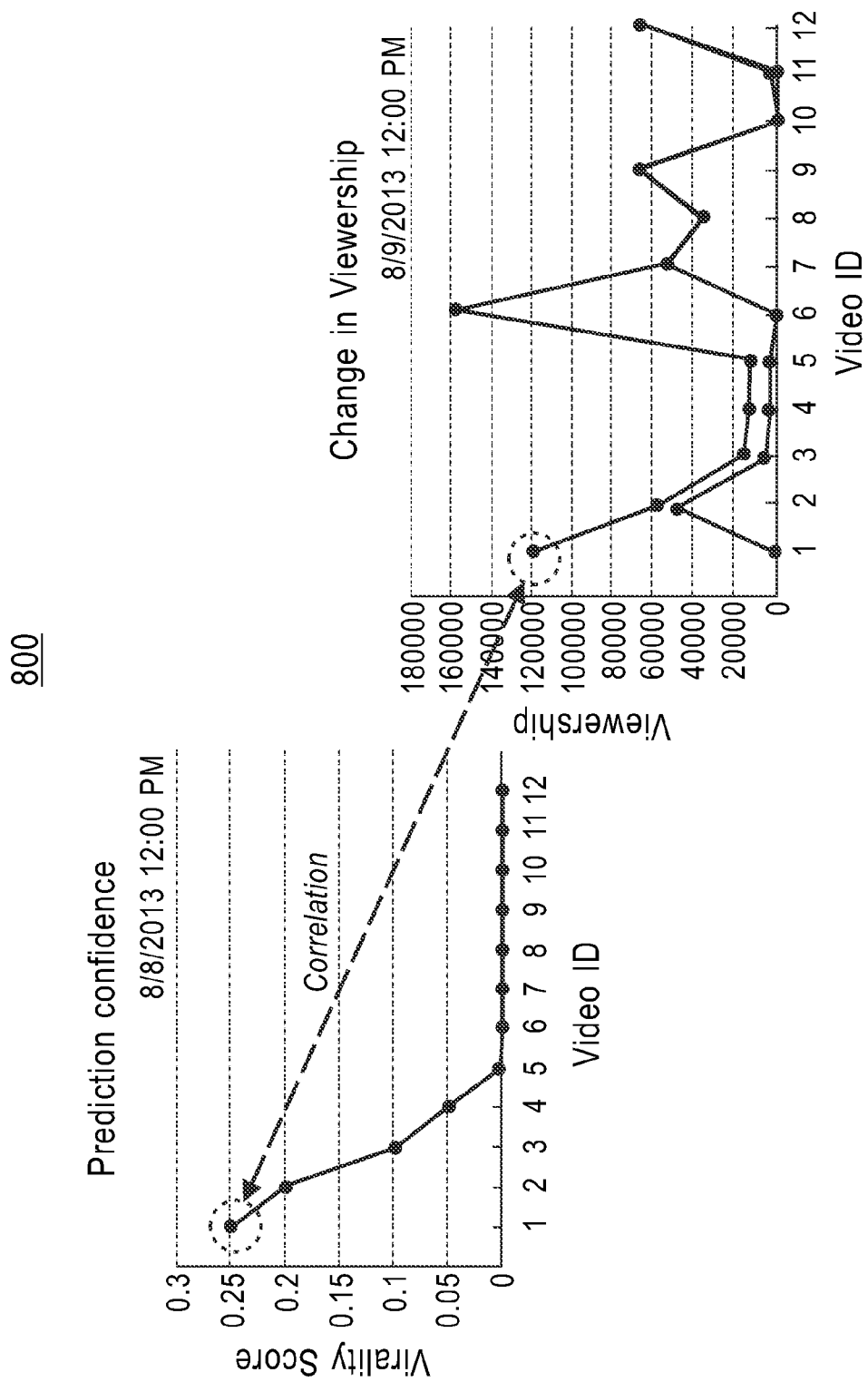
FIG. 8 is a set of graphs showing viral video prediction according to an embodiment of the present invention.
Figure 9:
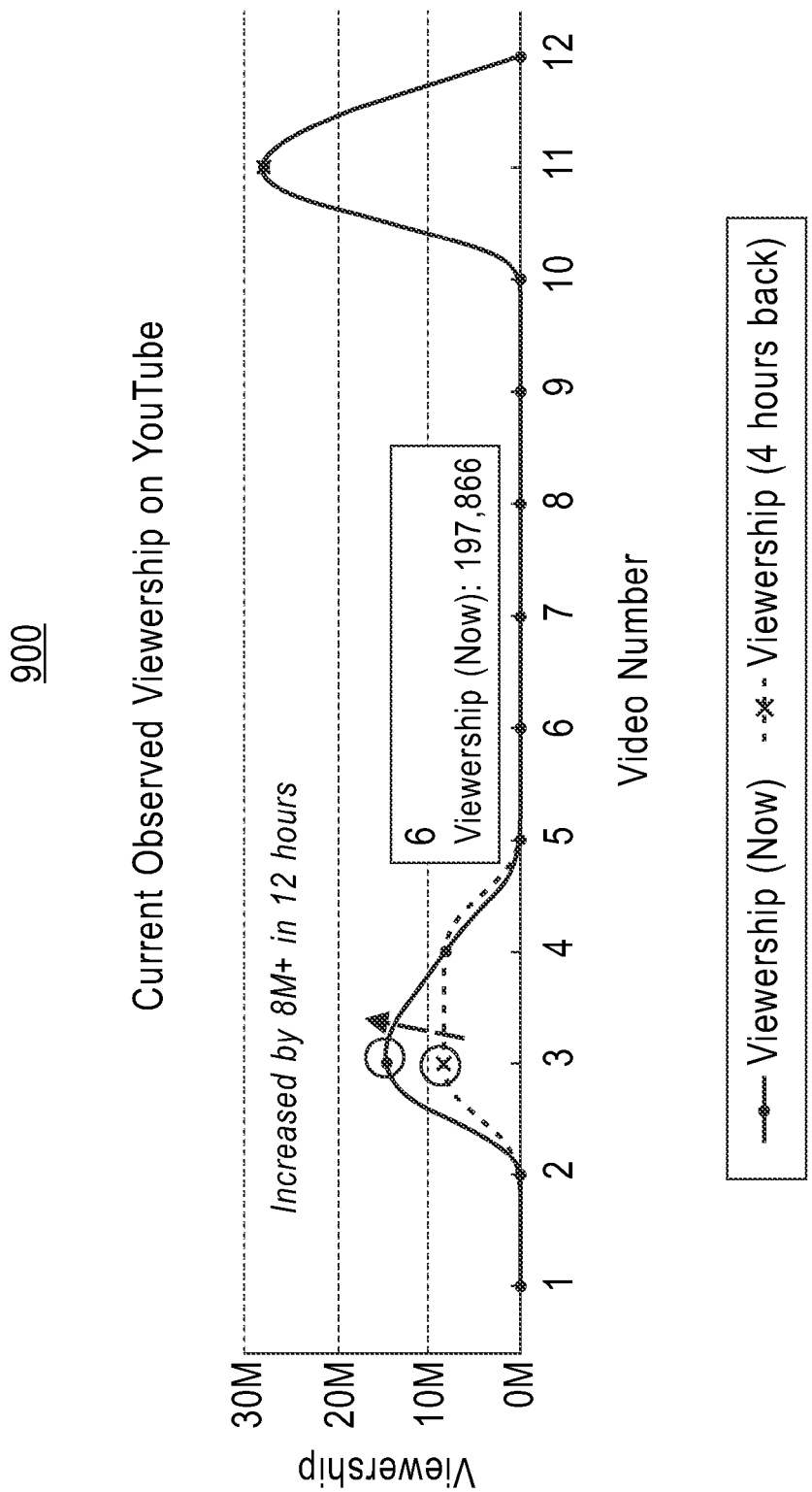
FIG. 9 is a graph showing viral video prediction according to an embodiment of the present invention.
Figure 10:
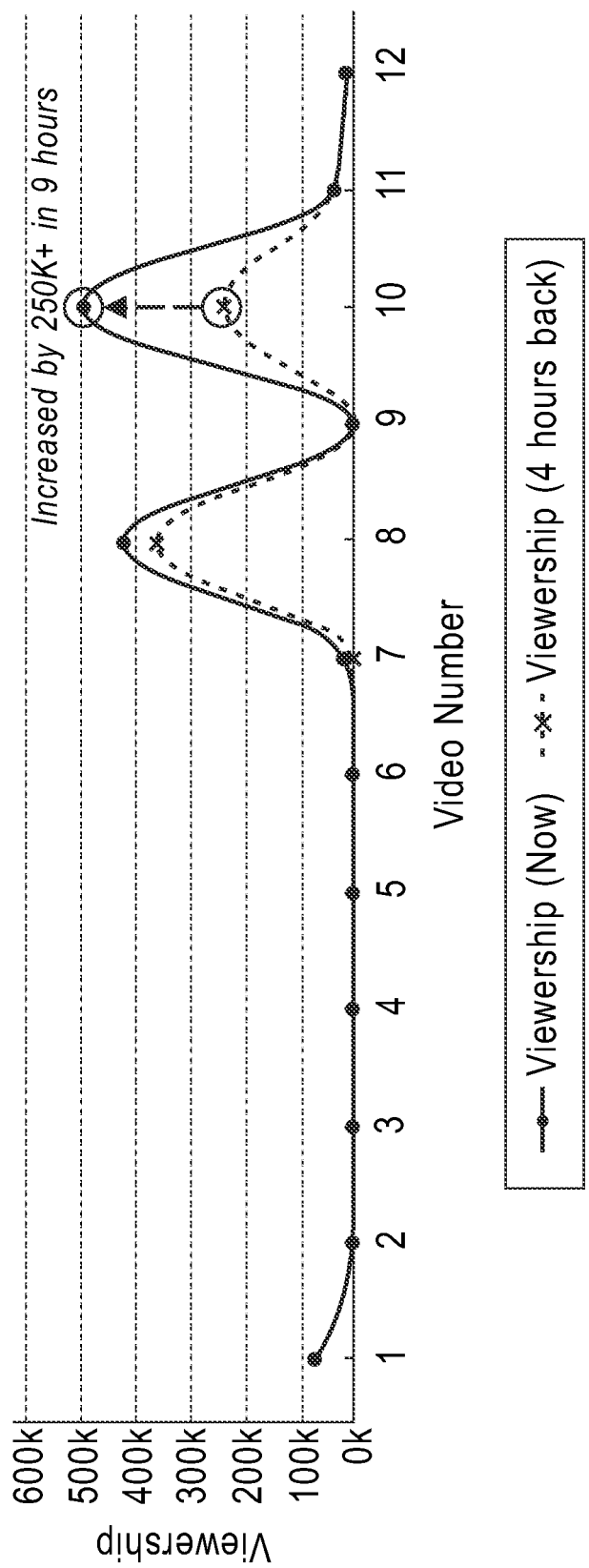
FIG. 10 is another graph showing viral video prediction according to an embodiment of the present invention.

FIG. 7 shows diagram 700 which shows how predictions made by the prediction pipeline of flow chart 600 are checked against actual page view type statistics that come from third party services, like Google Trends and YouTube. This type of prediction checking is further shown in: graph set 800 of FIG. 8, graph 900 of FIG. 9 and graph 950 of FIG. 10.

Figure 11:
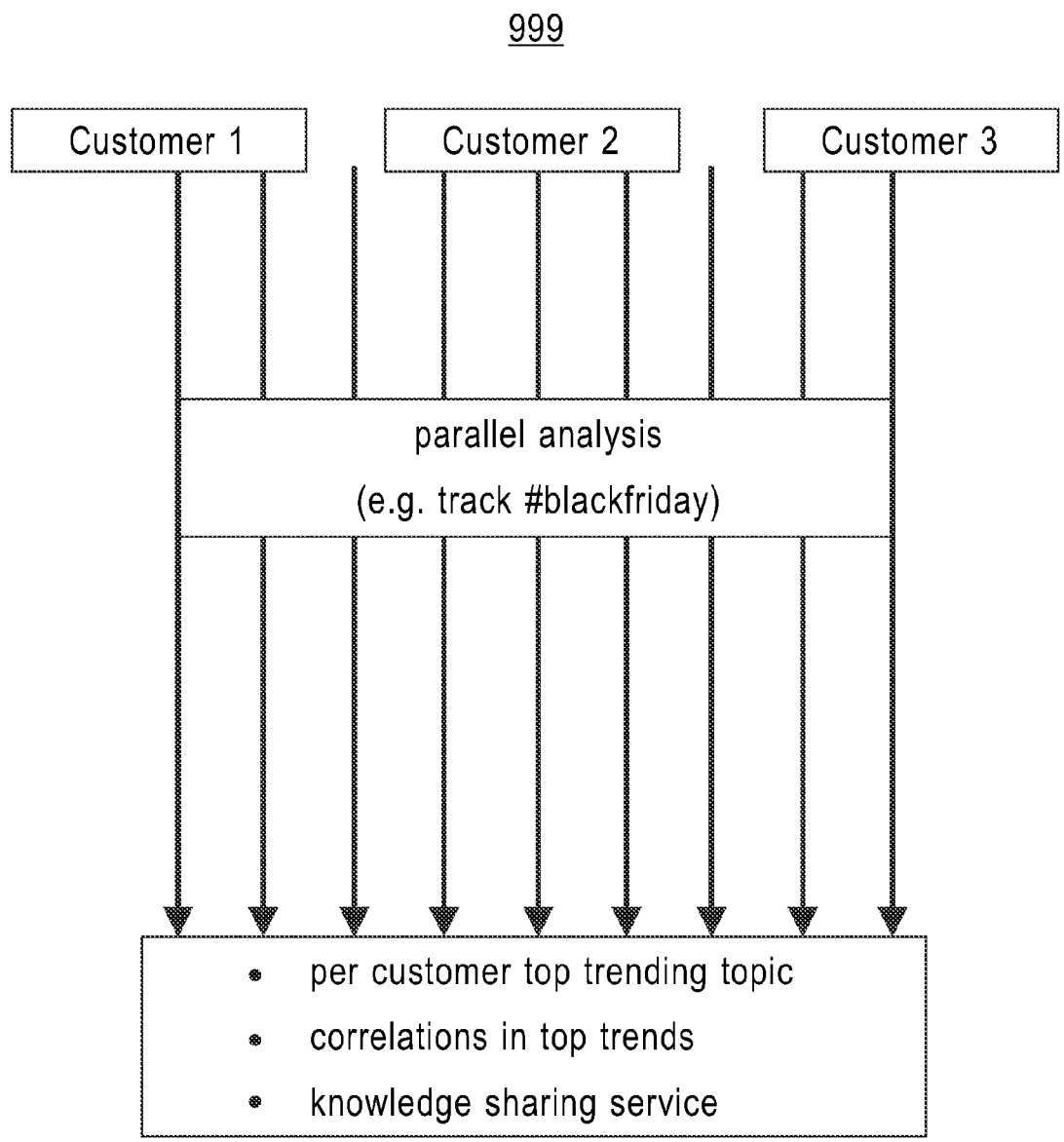
FIG. 11 is a diagram helpful in understanding some embodiments of the present invention.

As shown in FIG. 11, diagram 999 shows flow: (i) from customers' social activity postings; (ii) through parallel analysis by cloud-implemented graph generation and prediction pipeline software; and (iii) to per customer top trending topic, correlations in top trends and knowledge sharing service.

Some embodiments of the present invention may include one, or more, of the following features, characteristics and/or advantages: (i) consider concept of predicting YouTube; (ii) use Twitter APIs as a method of ingesting social messages; (iii) consider the concept of "viral videos" or their application to "viral marketing;" (iv) use machine learning as a mechanism for classifying social message content; (v) considers cloud scalability; (vi) incorporate machine learning as a method to enhance prediction from Twitter social messages; and/or (vii) use a large-scale social graph representation.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Substantive content: subject matter addressed, implicitly or explicitly, in a communication (human-generated or machine-generated); for example, the following two microblog posts both include "substantive content" related to the concept of basketball: (i) "I enjoy playing basketball, and (ii) "Traffic from the basketball game is delaying my journey."

Substantive content subject: substantive content as it is spread over the internet; for example, if the substantive content of the concept of basketball suddenly spreads over the internet, then, under terminology of the present document, it would be proper to say that the "substantive content subject" of basketball is suddenly spreading on the internet (as opposed to the game of basketball itself, which is usually not played on the internet, but, rather, in physical space); as a further example, if links to a video are spreading over the internet, then the "substantive content subject" of the video is spreading over the internet as a subject under discussion, which is to be distinguished from a situation where the data (for example *.avi data) corresponding to the video is necessarily being communicated.

Substantive online content: "substantive content" in the form of information which can be accessed over the internet; includes, but is not limited to web sites, online videos, online audio segments, online document files, online hashtag listings, etc.

Internet: any large scale communication network with a substantial amount on non-transient data, existing now, or in the future, regardless of whether such large scale communication network is commonly denominated as the "internet."

Updating a graph: may include creating of the graph, or may be limited to updating a pre-existing graph.

What is claimed is:

1. A method of processing a plurality of social messages, the method comprising:
receiving the plurality of social messages in real time;
filtering the plurality of social messages to determine a first sub-set of social message(s) from the plurality of social messages, wherein:
each message of the first sub-set of social message(s) is likely to relate to a first substantive content subject based, at least in part, on a guess by a machine learning process, and
a social message in the first sub-set of social message(s) is likely to relate to a first substantive content subject when the social message includes a set of terms about the first substantive content based, at least in part, on the machine learning process;
for each message in the first sub-set of social message(s), determining a respective social message sender and a corresponding social influence value for each respective social message sender;
estimating a likely social propagation of the message(s) of the first sub-set of social message(s) based, at least in part, on the social influence values of the respective sender(s) of the first sub-set of social message(s), wherein a social propagation is a sharing trend a social message in the first sub-set of social message(s) takes from the respective social message sender based, at least in part, on a social influence graph;
predicting a first spread of the first substantive content subject based, at least in part, on the machine learning process and the estimated likely social propagation of the first sub-set of social messages;
determining that a first message in the first sub-set of social message(s) is most likely to become a viral message as a heuristic, based at least in part on:
the machine learning process,
an identifier of the first message,
a list of microblog posts directed to the substantive content subject, and
a set of pagerank scores for the first message;
observing a confirmation that the first message became a viral message; and
training the machine learning process based, at least in part on the confirmation that the first message became a viral message to enhance an accuracy of the guess.

2. The method of claim 1 wherein:
at least some portion of at least some of the foregoing actions are performed on cloud-based computer resources.

3. The method of claim 2 wherein:
the plurality of social messages are respectively in the form of social network APIs (application programming interfaces) received from a first microblogging service; and
the social network APIs are designed by the first microblogging service.

4. The method of claim 3 wherein the first microblogging service is Twitter.

5. The method of claim 2 wherein:
the first substantive content subject is first substantive online content; and
the first substantive online content is a video available to be viewed or downloaded over the internet through a first online video service.

6. The method of claim 5 wherein the first online video service is YouTube.

7. The method of claim 2 wherein:
the first substantive content subject reflects a commercial campaign and/or promotion which is designed to be spread through viral marketing; and
the prediction of the first spread reflects a prediction of likely relative success of the commercial campaign and/or promotion.

8. The method of claim 2 further comprising:
performing machine learning classification techniques to help determine the manner of the filtering of the plurality of social messages; and
taking training from social message content of social messages to improve scalability;
wherein:
the prediction of the first spread of the first substantive content subject is based, at least in part, on the performance of the machine learning classification techniques; and
the prediction of the first spread of the first substantive content subject is based, at least in part, on the training taken from social message content.

9. The method of claim 2 wherein:
the portion performed on cloud-based computer resources is elastic and scalable so that a level of consumption of cloud-based computer resources changes depending on at least one of the following factors:
a level of social activity, or
a desired quality of analysis.

10. The method of claim 2 further comprising:
updating a social dependency graph which includes senders of all social messages of the plurality of social messages.

11. The method of claim 2 wherein the determination of social influence values is based, at least in part, upon a number of followers of each social message sender.

12. A computer program product for processing a plurality of social messages, the computer program product comprising a computer readable storage medium having stored thereon:
first program instructions programmed to receive the plurality of social messages in real time;
second program instructions programmed to filter the plurality of social messages to determine a first sub-set of social message(s) from the plurality of social messages, wherein:
each message of the first sub-set of social message(s) is likely to relate to a first substantive content subject based, at least in part, on a guess by a machine learning process, and
a social message in the first sub-set of social message(s) is likely to relate to a first substantive content subject when the social message includes a set of terms about the first substantive content based, at least in part, on the machine learning process;
third program instructions programmed to, for each message in the first sub-set of social message(s), determine a respective social message sender and a corresponding social influence value for each respective social message sender;
fourth program instructions programmed to estimate a likely social propagation of the message(s) of the first sub-set of social message(s) based, at least in part, on the social influence values of the respective sender(s) of the first sub-set of social message(s), wherein a social propagation is a sharing trend a social message in the first sub-set of social message(s) takes from the respective social message sender based, at least in part, on a social influence graph;
fifth program instructions programmed to predict a first spread of the first substantive content subject based, at least in part, on the machine learning process and the estimated likely social propagation of the first sub-set of social messages;
sixth program instructions programmed to determine that a first message in the first sub-set of social message(s) is most likely to become a viral message as a heuristic, based at least in part on:
the machine learning process,
an identifier of the first message,
a list of microblog posts directed to the substantive content subject, and
a set of pagerank scores for the first message;
seventh program instructions programmed to observe a confirmation that the first message became a viral message; and
eighth program instructions programmed to train the machine learning process based, at least in part on the confirmation that the first message became a viral message to enhance an accuracy of the guess.

13. The product of claim 12 wherein:
at least some portion of at least one of the first program instructions, second program instructions, third program instructions, fourth program instructions or fifth program instructions are further programmed to be performed on cloud-based computer resources.

14. The product of claim 13 wherein:
the plurality of social messages are respectively in the form of social network APIs (application programming interfaces) received from a first microblogging service; and
the social network APIs are designed by the first microblogging service.

15. The product of claim 13 wherein the first microblogging service is Twitter.

16. The product of claim 13 wherein:
the first substantive content subject is first substantive online content.

17. The product of claim 16 wherein:
the first substantive online content is a video available to be viewed or downloaded over the internet through a first online video service.

18. The product of claim 17 wherein the first online video service is YouTube.

19. A computer system for processing a plurality of social messages, the computer system comprising:
a processor(s) set; and
a computer readable storage medium;
wherein:
the processor set is structured, located, connected or programmed to run program instructions stored on the computer readable storage medium; and
the program instructions include:
first program instructions programmed to receive the plurality of social messages in real time;
second program instructions programmed to filter the plurality of social messages to determine a first sub-set of social message(s) from the plurality of social messages, wherein:
each message of the first sub-set of social message(s) is likely to relate to a first substantive content subject based, at least in part, on a guess by a machine learning process, and
a social message in the first sub-set of social message(s) is likely to relate to a first substantive content subject when the social message includes a set of terms about the first substantive content based, at least in part, on the machine learning process;
third program instructions programmed to, for each message in the first sub-set of social message(s), determine a respective social message sender and a corresponding social influence value for each respective social message sender;
fourth program instructions programmed to estimate a likely social propagation of the message(s) of the first sub-set of social message(s) based, at least in part, on the social influence values of the respective sender(s) of the first sub-set of social message(s), wherein a social propagation is a sharing trend a social message in the first sub-set of social message(s) takes from the respective social message sender based, at least in part, on a social influence graph;
fifth program instructions programmed to predict a first spread of the first substantive content subject based, at least in part, on the machine learning process and the estimated likely social propagation of the first sub-set of social messages;
sixth program instructions programmed to determine that a first message in the first sub-set of social message(s) is most likely to become a viral message as a heuristic, based at least in part on:
the machine learning process,
an identifier of the first message,
a list of microblog posts directed to the substantive content subject, and
a set of pagerank scores for the first message;
seventh program instructions programmed to observe a confirmation that the first message became a viral message; and
eighth program instructions programmed to train the machine learning process based, at least in part on the confirmation that the first message became a viral message to enhance an accuracy of the guess.

20. The system of claim 19 wherein:
at least some portion of at least one of the first program instructions, second program instructions, third program instructions, fourth program instructions or fifth program instructions are further programmed to be performed on cloud-based computer resources; and
the portion of the first program instructions, second program instructions, third program instructions, fourth program instructions or fifth program instructions performed on cloud-based computer resources is elastic and scalable so that a level of consumption of cloud-based computer resources changes depending on at least one of the following factors:
a level of social activity, or
a desired quality of analysis.

* * * * *